United States Patent
Lee et al.

(10) Patent No.: US 7,978,733 B2
(45) Date of Patent: Jul. 12, 2011

(54) METHOD FOR GENERATING SUBFRAME INCLUDING RESOURCE DISTRIBUTION INFORMATION

(75) Inventors: Wook Bong Lee, Anyang-si (KR); Young Soo Yuk, Anyang-si (KR); Han Gyu Cho, Anyang-si (KR); Sung Ho Moon, Anyang-si (KR); Jin Sam Kwak, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 156 days.

(21) Appl. No.: 12/403,129

(22) Filed: Mar. 12, 2009

(65) Prior Publication Data

US 2009/0232163 A1 Sep. 17, 2009

Related U.S. Application Data

(60) Provisional application No. 61/036,081, filed on Mar. 13, 2008.

(30) Foreign Application Priority Data

Apr. 11, 2008 (KR) .................. 10-2008-0033672
Apr. 18, 2008 (KR) .................. 10-2008-0036333

(51) Int. Cl.
*H04J 3/00* (2006.01)

(52) U.S. Cl. ...................... 370/476; 370/208

(58) Field of Classification Search .............. 370/208, 370/470–476; 375/219, 295, 316, 260; 455/450
See application file for complete search history.

(56) References Cited

U.S. PATENT DOCUMENTS

| 7,627,048 B2* | 12/2009 | Larsson | 375/260 |
| 7,729,310 B2* | 6/2010 | Kim | 370/330 |
| 2006/0256887 A1* | 11/2006 | Kwon et al. | 375/260 |
| 2007/0259672 A1* | 11/2007 | Heo et al. | 455/452.2 |
| 2009/0225714 A1* | 9/2009 | Kim et al. | 370/329 |
| 2010/0040080 A1* | 2/2010 | Um et al. | 370/437 |
| 2010/0061223 A1* | 3/2010 | Kim et al. | 370/208 |

* cited by examiner

*Primary Examiner* — Gary Mui
(74) *Attorney, Agent, or Firm* — Birch, Stewart, Kolasch & Birch, LLP

(57) ABSTRACT

A method for generating a subframe including resource distribution information is disclosed. The method for generating a subframe includes arranging resource allocation information in a subframe by sequentially allocating a localized permutation and a distributed permutation, and arranging a subframe control header including a resource unit index in a predetermined location by a system parameter, wherein the resource unit index indicates a frequency resource location of the resource allocation information. When both the localized permutation and the distributed permutation are used, a resource distribution method is transmitted to a user equipment. Therefore, an effect of the distributed permutation can be maximized without a great influence on the performance of the localized permutation, and a problem of decoding failure or latency can be prevented.

14 Claims, 13 Drawing Sheets

METHOD FOR GENERATING SUBFRAME INCLUDING RESOURCE DISTRIBUTION INFORMATION

CROSS-REFERENCE TO RELATED APPLICATIONS

This application claims the benefit of the U.S. Provisional Application No. 61/036,081 filed on Mar. 13, 2008, which are hereby incorporated by reference as if fully set forth herein.

This application claims the benefit of Korean Patent Application Nos. 10-2008-0033672 and 10-2008-0036333 filed on Apr. 11, 2008 and Apr. 18, 2008 respectively, which is hereby incorporated by reference as if fully set forth herein.

BACKGROUND OF THE INVENTION

1. Field of the Invention

The present invention relates to permutation, and more particularly, to a method for generating a subframe indicating a transmission location of resource allocation information in a structure in which the resource allocation information is transmitted every subframe.

2. Discussion of the Related Art

A subframe or miniframe is used as a basic allocation unit of a downlink or uplink. A subframe or miniframe structure is used in $3^{rd}$ generation partnership project (3GPP) long term evolution (LTE), ultra mobile broadband (UMB), etc. and has been discussed as one candidate in IEEE 802.16m.

FIG. 1 illustrates an example of a superframe structure.

A superframe is the largest unit comprised of a few tens of ms. The superframe refers to a resource group in the time domain from a preamble or superframe header, which is a downlink synchronization channel, to the next preamble or superframe header. The superframe is divided into frames, each of which is classified into subframes. A subframe is a basic resource allocation unit. In IEEE 802.16m, the subframe is generally comprised of 6 orthogonal frequency division multiplexing (OFDM) symbols.

In an orthogonal frequency division multiple access (OFDMA) system, a physical resource is expressed as a two-dimensional resource using a frequency resource and a time resource.

FIG. 2 illustrates an example of two-dimensional resource allocation.

The most efficient method for allocating OFDMA resources is two-dimensional allocation of the time resource and the frequency resource. However, since a location of the time resource and a location of the frequency resource are separately represented, overhead is increased.

FIG. 3 illustrates an example of one-dimensional resource allocation.

In a method for allocating resources in units of a subframe, resource allocation overhead can be reduced by providing only frequency resource indexes and allocating locations determined in units of a subframe in the time domain. Then, since resources are easily allocated, the allocation method in units of a subframe can efficiently use the resources.

A method for allocating resources within a subframe may be broadly divided into a method for allocating concatenated frequency resources and a method for distributing separated frequency resources.

The method for allocating the concatenated frequency resources is called localized permutation and is favorable when a low-speed user equipment uses adaptive modulation and coding (AMC) or beamforming/precoding. The method for distributing separated frequency resources is called distributed permutation and is favorable for a high-speed user equipment, or a user equipment which is not suitable for AMC or precoding.

Any one of the localized permutation and the distributed permutation or both of them may be used in one subframe.

Although a method using the permutation of two types can optimally configure each permutation, distribution of user equipments that prefer the permutation of two types may not coincide with a unit of a subframe.

Allocation of the permutation of two types to one subframe may be divided into two methods. First, the localized permutation is allocated first and then the distributed permutation is allocated. The second method is to allocate the distributed permutation first and then to allocate the localized permutation.

In the first method, the performance of the localized permutation is superior but the performance of the distributed permutation may be worse. On the other hand, in the second method, the performance of the distributed permutation is superior but the performance of the localized permutation may be worse. Generally, since a substantial number of user equipments prefer the localized permutation and since the performance of user equipments that prefer the localized permutation is superior to the performance of user equipments that prefer the distributed permutation, the user equipments prefer using the first method.

Resource allocation information for allocating resources in a subframe structure needs to be decoded by all user equipments or to be informed of the location of the resource allocation information. In the case where the resource allocation information should be transmitted by the distributed permutation, if the localized permutation is allocated first and then the distributed permutation is allocation, it is difficult for a user equipment to confirm which resource contains the resource allocation information.

FIG. 4 illustrates an example of a resource distribution process for allocating the localized permutation first and then allocating the distributed permutation.

A band selection resource unit (RU) refers to a physical resource of the localized permutation. Resource units except for a band selection resource unit are re-numbered (410) to configure mini-resource units and permutation is performed (420). If permutation in units of subcarriers is performed upon resources obtained by performing the permutation in units of a mini-resource unit (430), locations of resource allocation information (MAP) are determined.

Since the location of the MAP is determined after the band selection resource unit is determined, if a resource allocation method such as the location of the localized permutation is not confirmed, a user equipment cannot know the location of the resource allocation information. To solve this problem, a method may be considered for allocating the distributed permutation first and then allocating the localized permutation, thereby informing the user equipment of the location of the resource allocation information. However, since such a method affects the performance of the localized permutation, overall system performance may be deteriorated.

Meanwhile, in a method for informing a user equipment of the resource distribution method such as the localized permutation in a previous subframe, since resource allocation of a corresponding subframe should be performed in the previous subframe, the method is unfavorable in data latency. Moreover, if the user equipment has not read or could not read the resource distribution method in the previous subframe, the user equipment may not continue to read the resource allocation information.

SUMMARY OF THE INVENTION

Accordingly, the present invention is directed to a method for generating a subframe that substantially obviates one or more problems due to limitations and disadvantages of the related art.

An object of the present invention is to provide a method for generating a subframe, which can transmit a resource distribution method to a user equipment when allocating a localized permutation first and then allocating a distributed permutation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for generating a subframe includes arranging resource allocation information in a subframe by sequentially allocating a localized permutation and a distributed permutation, and arranging a subframe control header including a resource unit index in a predetermined location by a system parameter, wherein the resource unit index indicates a frequency resource location of the resource allocation information.

In an aspect of the present invention, a method for generating a subframe constituting a superframe includes adding location information of a subframe control header in a super MAP of the superframe, arranging resource allocation information in the subframe by sequentially allocating a localized permutation and a distributed permutation, and arranging the subframe control header including a resource unit index according to the location information, wherein the resource unit index indicates a frequency resource location of the resource allocation information.

The resource unit index may be information indicating at least one of a location of resource units of the resource allocation information and the number of the resource units.

The subframe control header may include locations of groups generated according to the localized permutation out of the resource allocation information.

The subframe control header may include the number of resource units belonging to the generated groups.

The arrangement of the subframe control header may arrange the subframe control header in subcarriers except for guard subcarriers.

The arrangement of the subframe control header may arrange the subframe control header in two or more consecutive subframes.

In another aspect of the present invention, a method for generating a subframe transmitted by a multicarrier scheme includes arranging resource allocation information in a first band and a second band of the subframe by sequentially allocating a localized permutation and a distributed permutation, and arranging a first subframe control header and a second subframe control header including a resource unit index in the subframe, wherein the resource unit index indicates a frequency resource location of the resource allocation information of each band.

The arrangement of the first and second subframe control headers may arrange the first subframe control header in the first band and arranges the second subframe control header in the second band.

In a further aspect of the present invention, a method for generating a subframe transmitted by a multicarrier scheme includes arranging resource allocation information in a first band and a second band of the subframe by sequentially allocating a localized permutation and a distributed permutation, and arranging a first subframe control header including a resource unit index only in the first band, wherein the resource unit index indicates a frequency resource location of the resource allocation information of the first band.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. The exemplary embodiments of the invention may be modified in various forms and the invention should not be limited to the specific embodiments described herein.

In the exemplary embodiments of the present invention, a method for informing a user equipment of a resource distribution method through an additional control message in a fixed location within a subframe is provided. Further, a method for maximally inducing a distributed permutation effect, that is, a frequency diversity effect without a great influence on localized permutation performance is considered.

In the exemplary embodiments of the present invention, a subframe control header (SFCH) includes an additional control message for informing a user equipment of a resource distribution method.

The SFCH may include information as to a resource distribution method and other subframe common control information. The common control information may include an acknowledgement (ACK)/negative acknowledgement (NACK) for an uplink or a group ACK/NACK.

Figure 1:
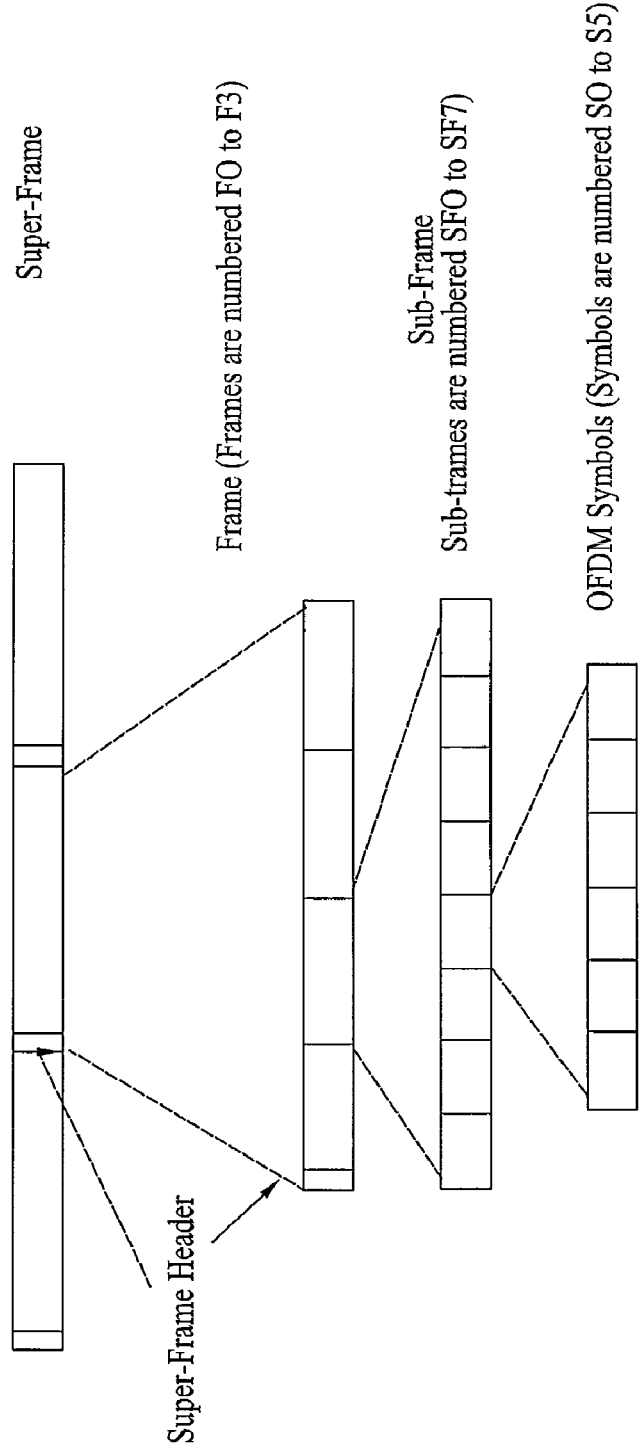
FIG. 1 illustrates an example of a superframe structure.
Figure 2:
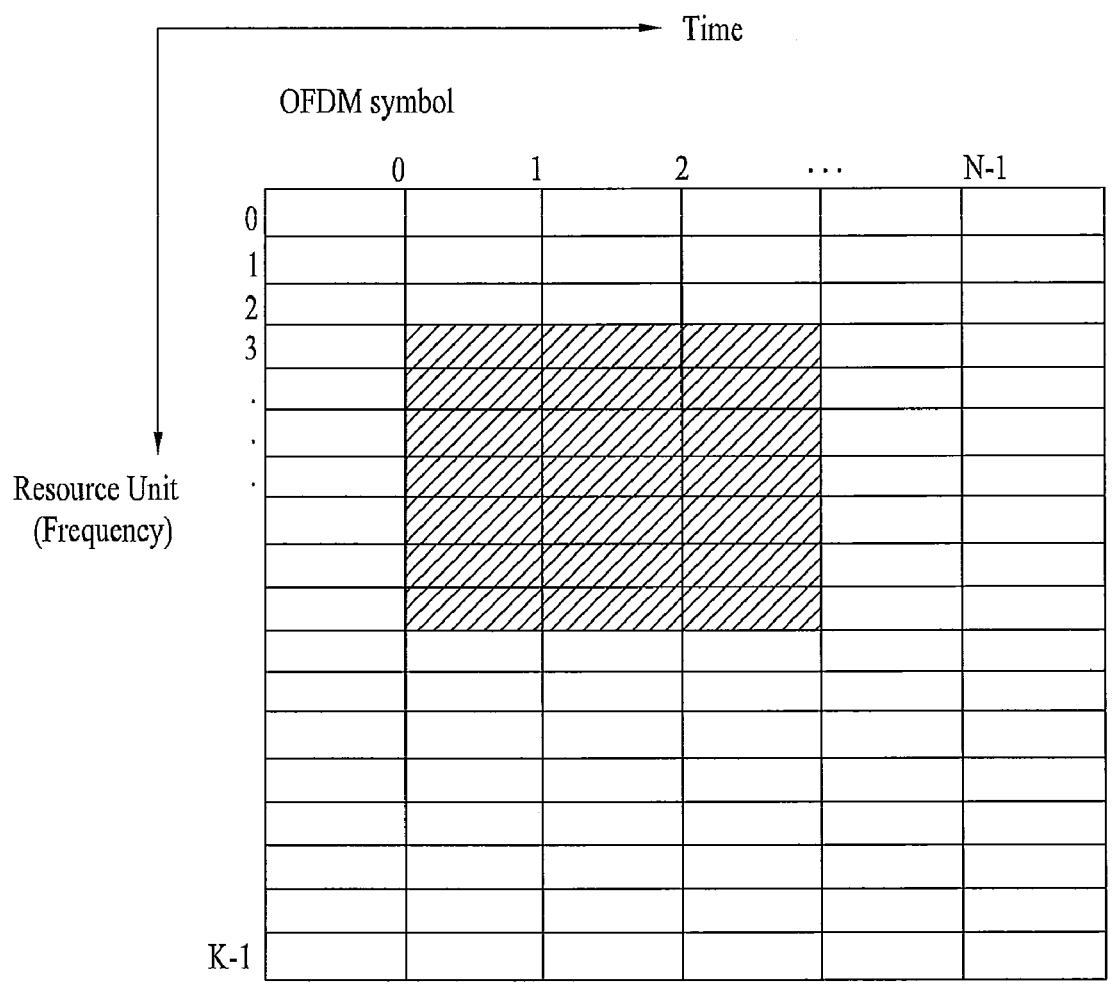
FIG. 2 illustrates an example of two-dimensional resource allocation.
Figure 3:
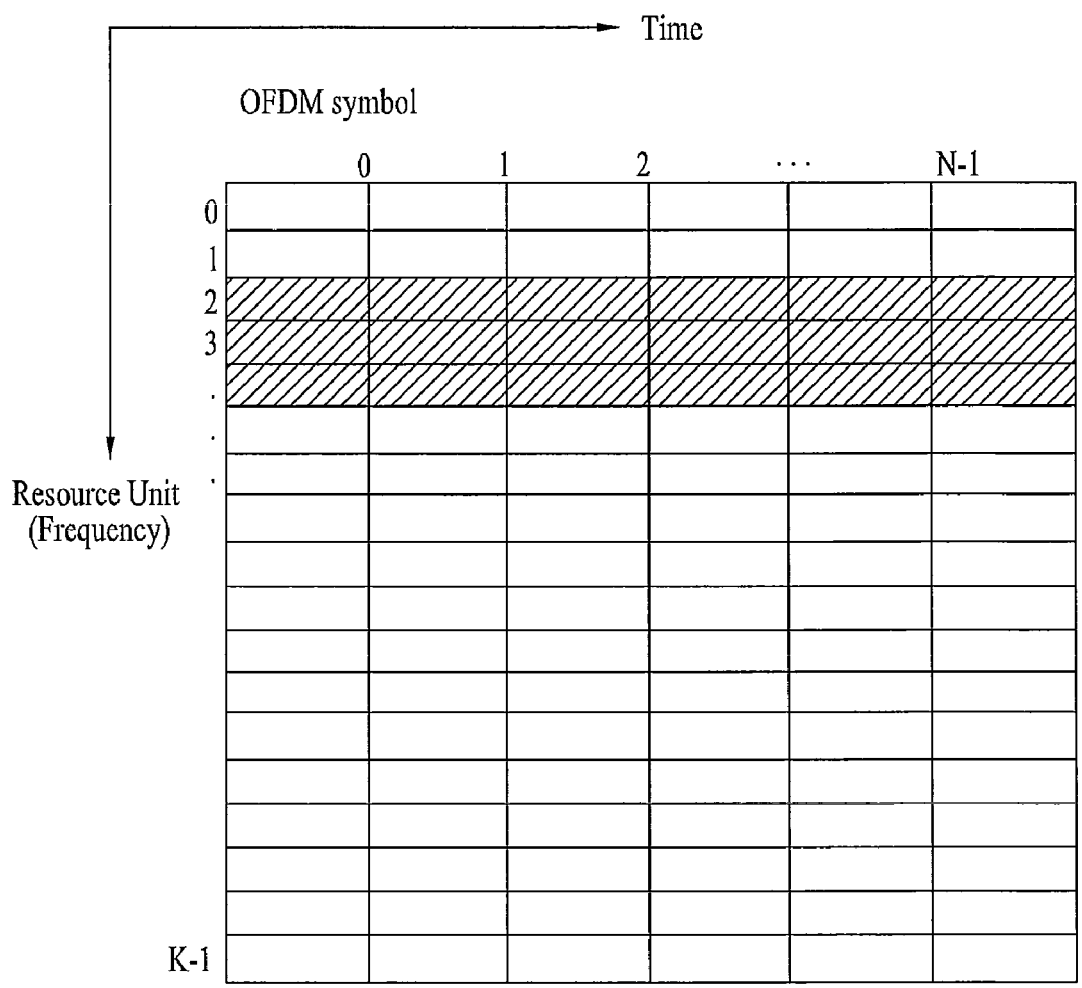
FIG. 3 illustrates an example of one-dimensional resource allocation.
Figure 4:
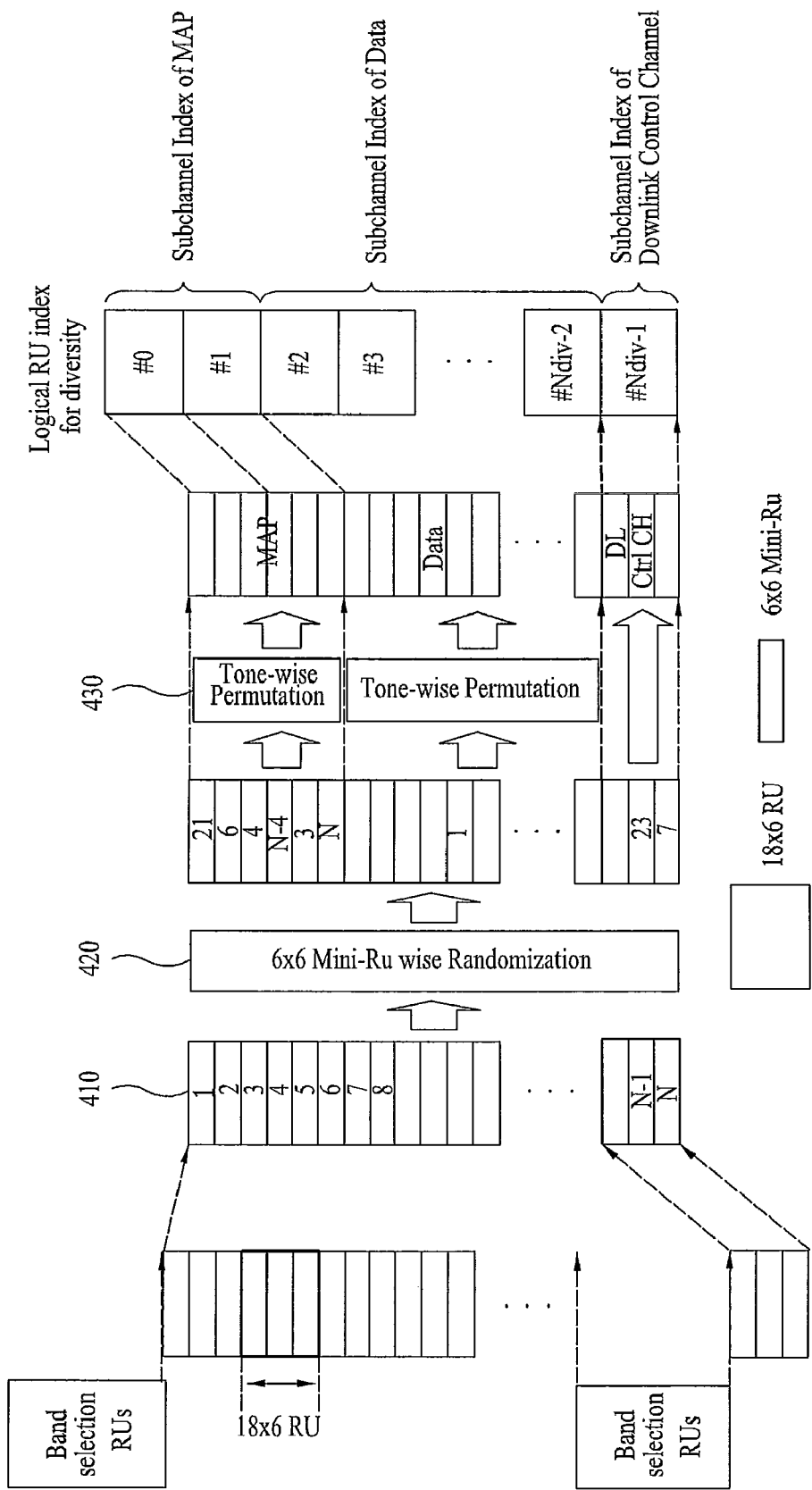
FIG. 4 illustrates an example of a resource distribution process for allocating a localized permutation first and then allocating a distributed permutation.
Figure 5A:
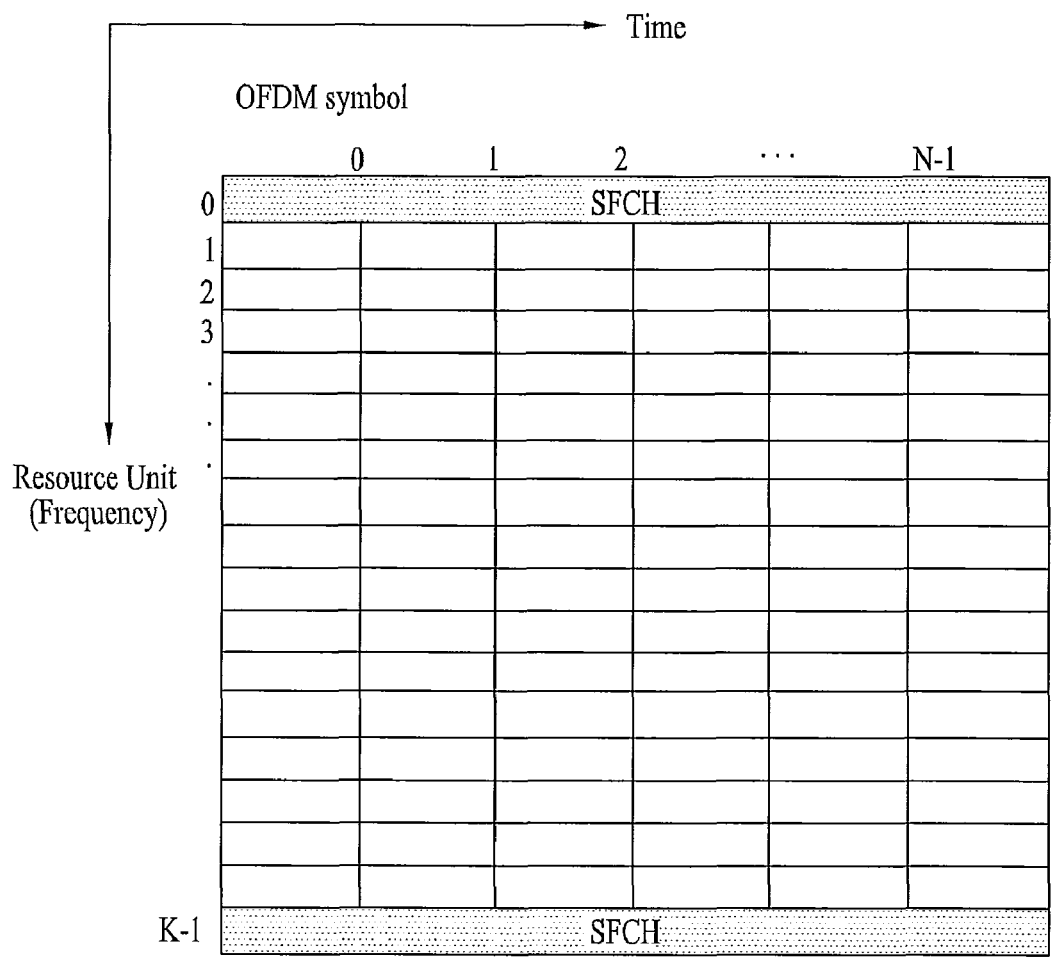
FIGS. 5a and 5b illustrate examples of a subframe structure according to an exemplary embodiment of the present invention.
Figure 5B:
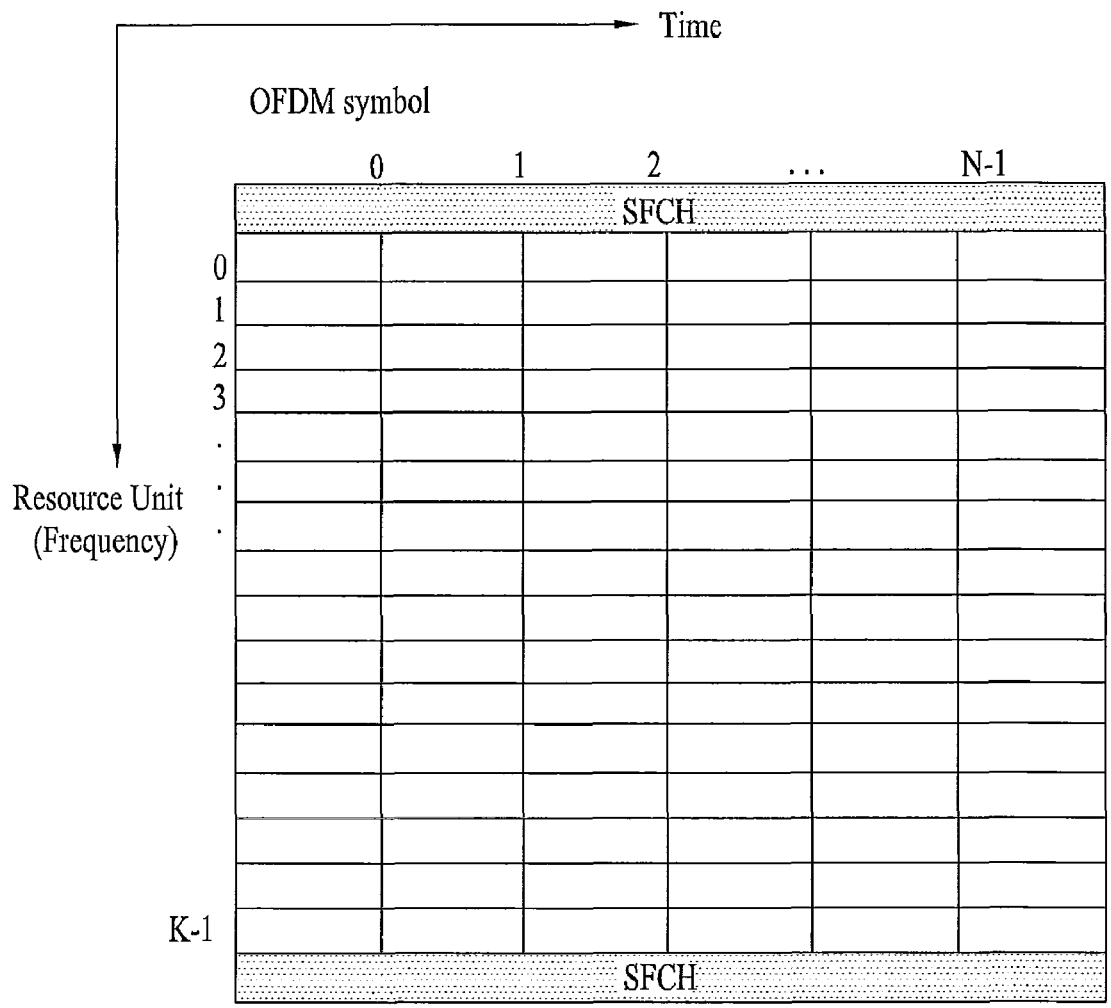

FIGS. 5a and 5b illustrate examples of a subframe structure according to an exemplary embodiment of the present invention.

As illustrated in FIG. 5a, a resource unit index or a group resource unit index may include an index of resources on which an SFCH is transmitted. Alternatively, as illustrated in FIG. 5b, indexes may be assigned to resources except for resources on which SFCHs are transmitted. Hereinafter, a description will be given based on the indexes shown in FIG. 5b.

In the subframes of FIGS. 5a and 5b, resource allocation information is arranged by sequentially allocating a localized permutation and a distributed permutation.

The SFCH includes a resource unit index indicating a frequency resource location of the resource allocation information. The resource allocation information includes a MAP message, etc.

The SFCH may be arranged in a predetermined location by a parameter etc. in a system or may be arranged according to a parameter defined by a super MAP. Meanwhile, the size of the SFCH may be fixed by the parameter in the system or may be fixed by designating a related parameter in the super MAP. For example, the SFCH may use resources which are physically comprised of the first few subcarriers and the last few subcarriers in a subframe. Alternatively, the SFCH may use the first one or more resource units and the last one or more resource units.

When allocating a few resource units in units of a group, resource distribution information may indicate, through a bitmap, which group resource unit is used for a localized permutation. Alternatively, the resource distribution information may indicate, by combination, the number of group resource units used as a localized permutation and a location of the localized permutation.

For example, it is assumed that there are a total of 48 resource units, two resource elements are used for an SFCH and therefore 46 resource units are available, the number of resource units belonging to one group resource unit is 2, and group resource units 3, 5, and 8 are used for a localized permutation. In the above example, the number of group resource units used for a localized permutation is 3.

If the number of resource units belonging to one group resource unit is known through a system control channel of other purposes or is previously determined in a system, a localized permutation bitmap may be expressed by 00010100100000000000000. In this case, a combination index indicating both the number of resource units and the location of resource units by a bitmap need not be used. The above bitmap is for 23 group resource units. If an index of a resource on which an SFCH is transmitted is included, a bitmap for 24 group resource units may be used.

Meanwhile, if the number of resource units belonging to one group resource unit is known through an SFCH, the number of resource units belonging to one group resource unit is 2 and a localized permutation bitmap may be expressed by 00010100100000000000000. This bitmap is for 23 group resource units. If an index of a resource on which an SFCH is transmitted is included, a bitmap for 24 group resource units may be used. In this case, a combination index indicating both the number of resource units and the location of resource units by a bitmap need not be used.

If the location and number of resource allocation information are known by being mapped to an entire resource unit irrespective of the number of resource units belonging to one group resource unit, a localized permutation bitmap may be expressed using a combination index by 00 00 00 11 00 11 00 00 11 00 00 00 00 00 00 00 00 00 00 00 00 00 00. This bitmap is for 46 group resource units. If an index of a resource on which an SFCH is transmitted is included, a bitmap for 48 group resource units may be used.

Figure 6:
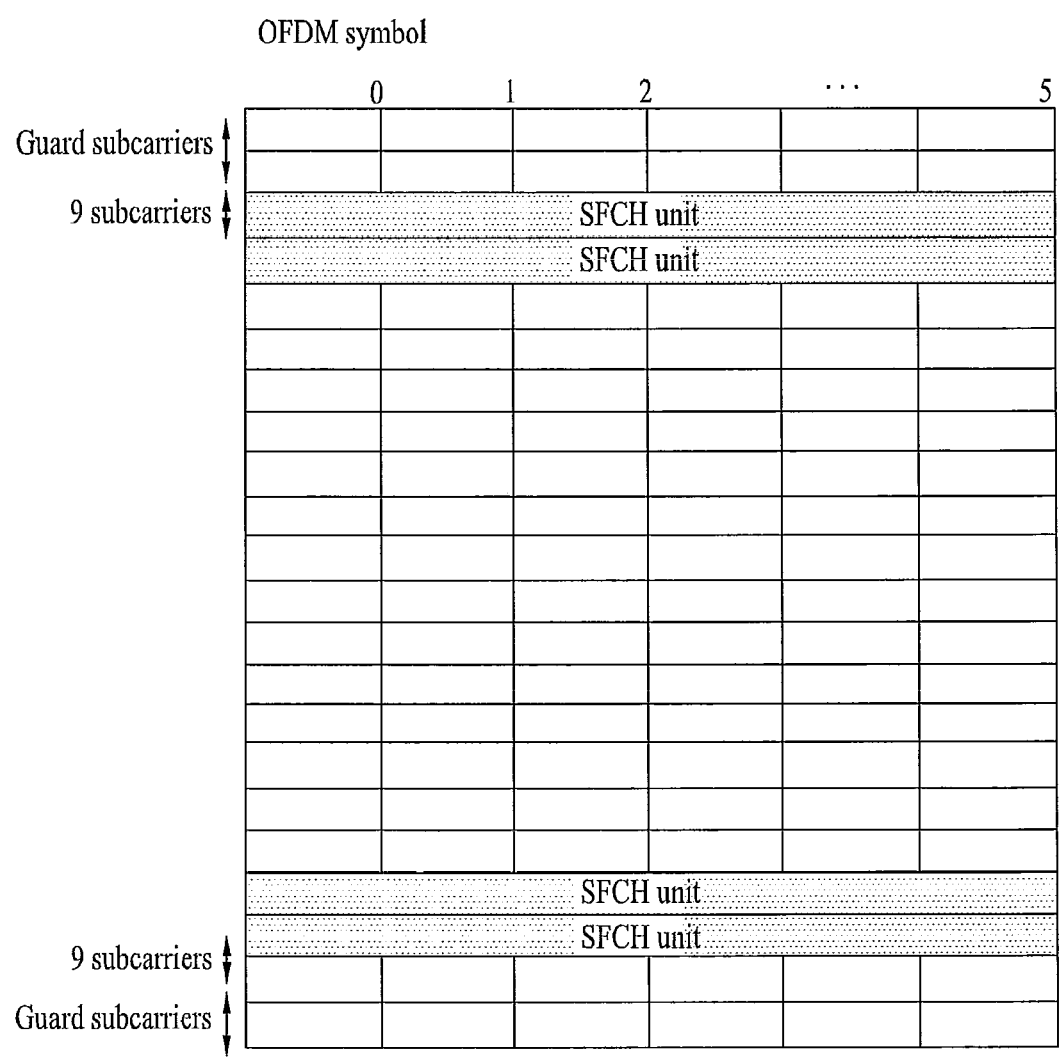
FIGS. 6 and 7 illustrate examples applying guard subcarriers to the subframe structure of FIG. 5b.
Figure 7:
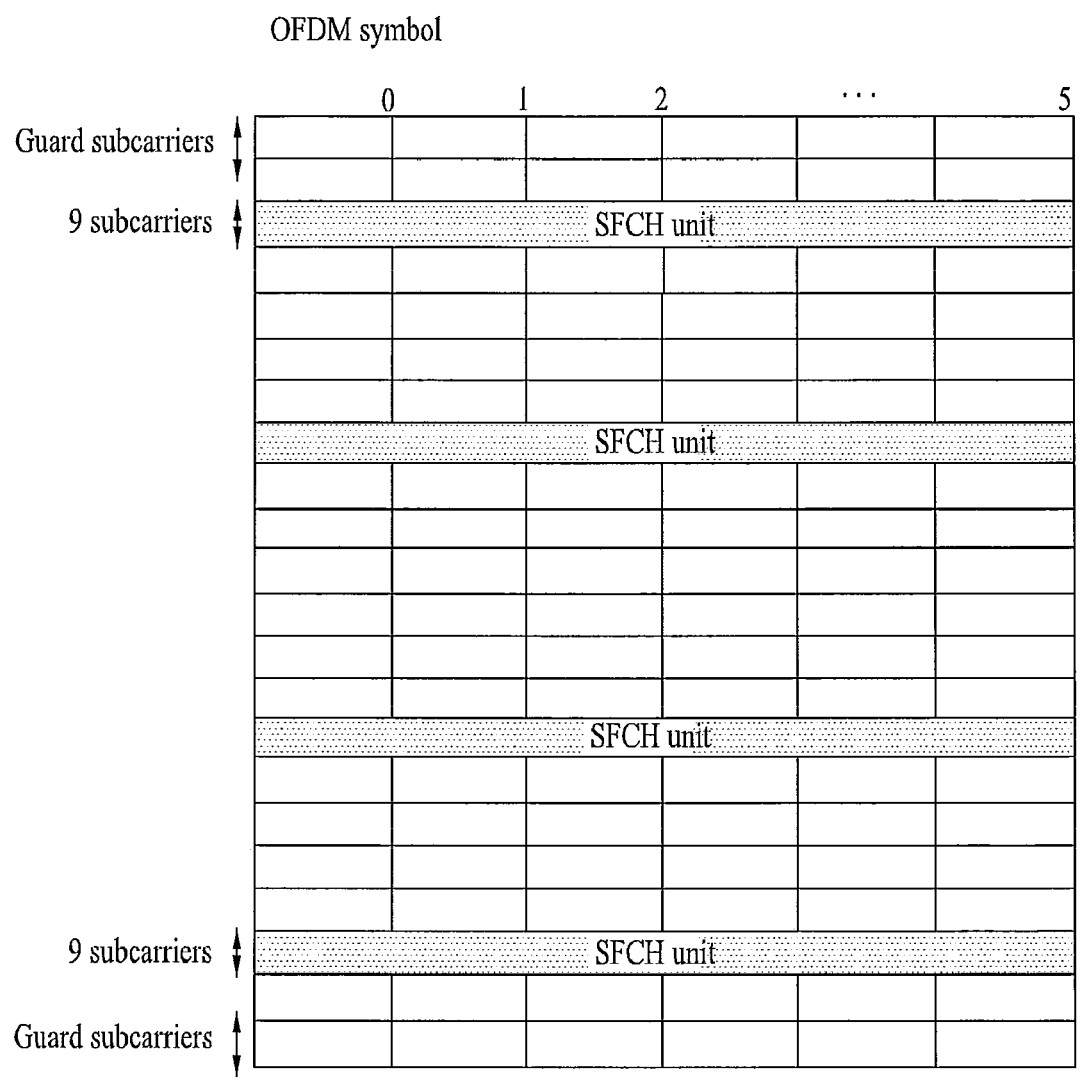

FIGS. 6 and 7 illustrate examples applying guard subcarriers to the subframe structure of FIG. 5b.

An SFCH may be arranged in subcarriers except for a guard subcarriers. Meanwhile, the SFCH comprised of a basic unit including a few subcarriers is called an SFCH unit. Although in FIGS. 6 and 7, 9 subcarriers are indicated as one SFCH unit, the scope of the present invention is not limited thereto.

For example, it is assumed that an SFCH is comprised of a total of 36 subcarriers in the frequency domain and 6 OFDM symbols. In this case, the SFCH is comprised of 216 subcarriers including pilots.

If an SFCH unit is comprised of 9 subcarriers in the frequency domain, since one subcarrier is comprised of 6 OFDM symbols, the SFCH is comprised of 54 subcarriers including pilots.

The SFCH unit may be comprised of 18 subcarriers in the frequency domain. If one subcarrier is comprised of 6 OFDM symbols, the SFCH is comprised of 108 subcarriers including pilots.

A physical resource block comprised of a prescribed number of subcarriers and a prescribed number of OFDM symbols, that is, $N_{sc} \times N_{symbol}$ (=the number of subcarriers×the number of OFDM symbols), may be used as a resource allocation unit constituting the SFCH unit. If the size of the SFCH unit is $L_{SFU} \times N_{symbol}$, a construction satisfying $N_{sc}$ mod $L_{SFU}=0$ can be made.

If there are a total of $N_{SFU}$ SFCH units, $L_{SFU} \times N_{SFU}$ should equal to n $N_{sc}$ (where n=1, 2, . . . ) and space between SFCH units should be always a multiple of an integral number of a physical resource block size.

The allocation location of the SFCH unit may be differently applied with respect to each cell in order to avoid interference between cells. For example, a circular shift may be applied in the frequency domain in units of $N_{sc}$.

If one subframe size corresponds to an irregular subframe which is greater or less than the number of OFDM symbols of a regular subframe, the number of OFDM symbols of the SFCH unit may be the same as the number of irregular subframes.

Figure 8:
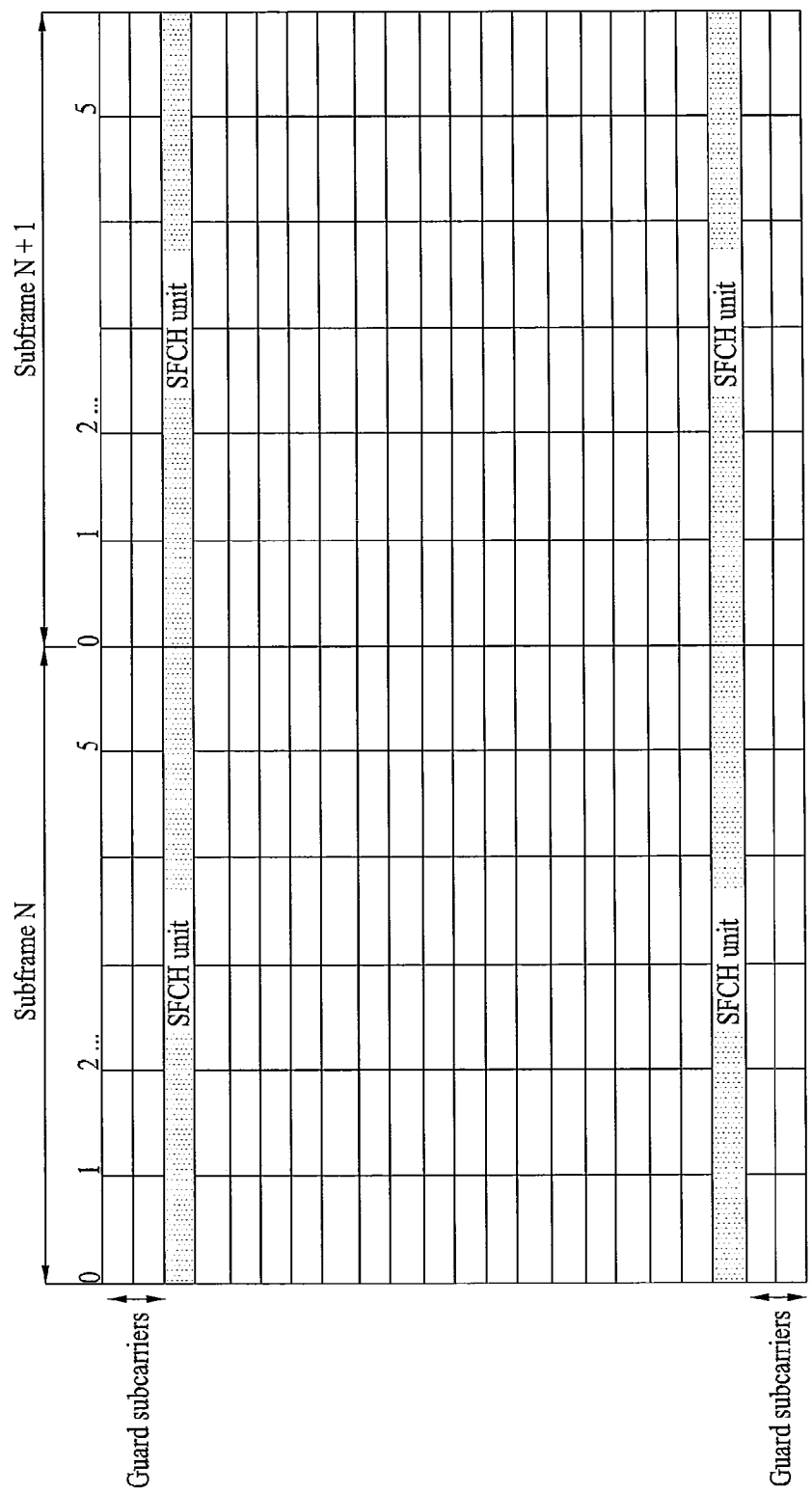
FIG. 8 illustrates an example arranging the SFCH of FIG. 5b in consecutive subframes.

FIG. 8 illustrates an example arranging the SFCH of FIG. 5b in consecutive subframes.

When resources are allocated in multiple subframes as one MAP, the SFCH may be arranged in two or more consecutives subframes. The arranged SFCH may be an SFCH unit.

Figure 9:
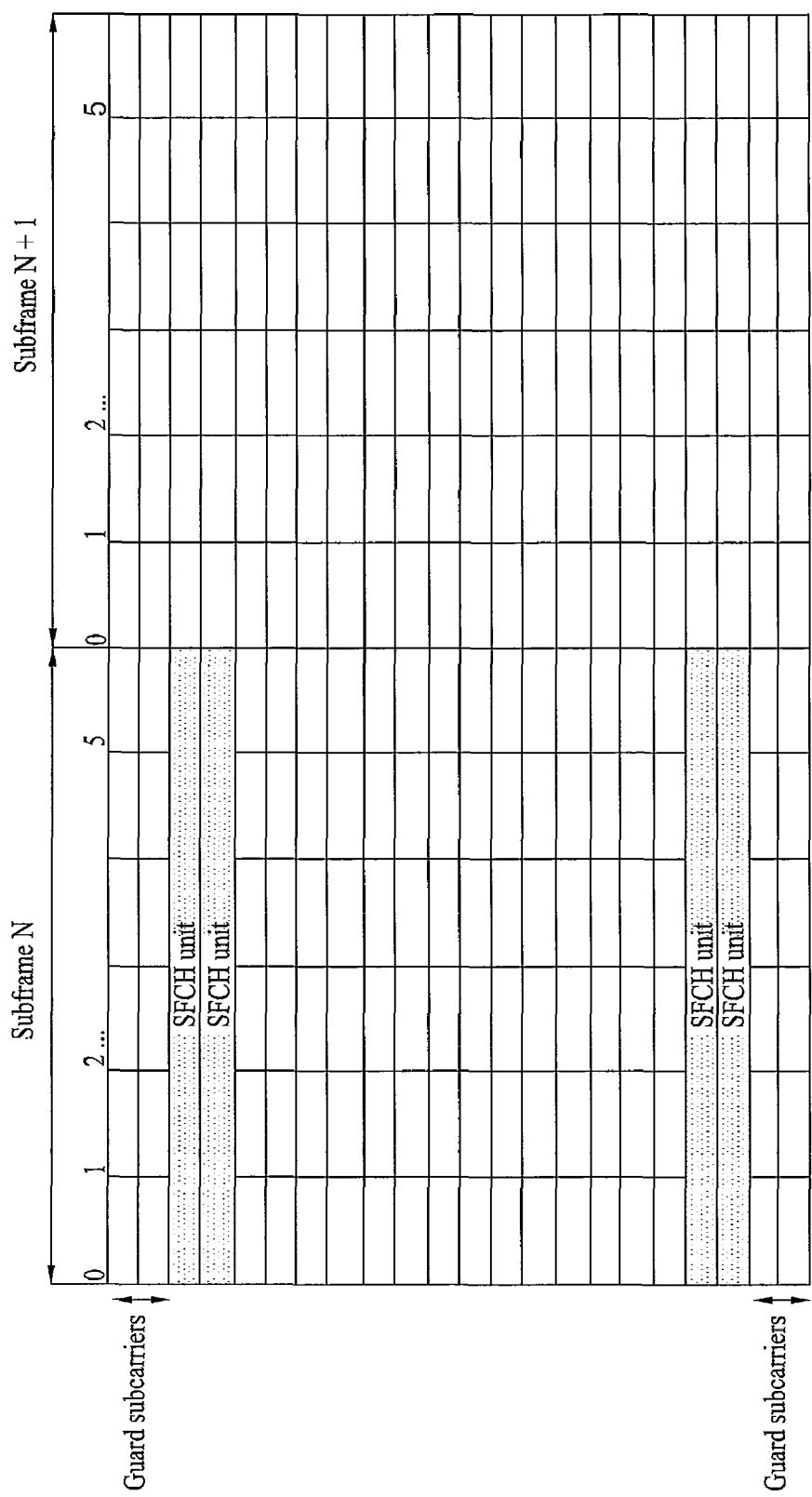
FIGS. 9 and 10 illustrate examples arranging the SFCH of FIG. 5b at intervals of one or more subframes.
Figure 10:
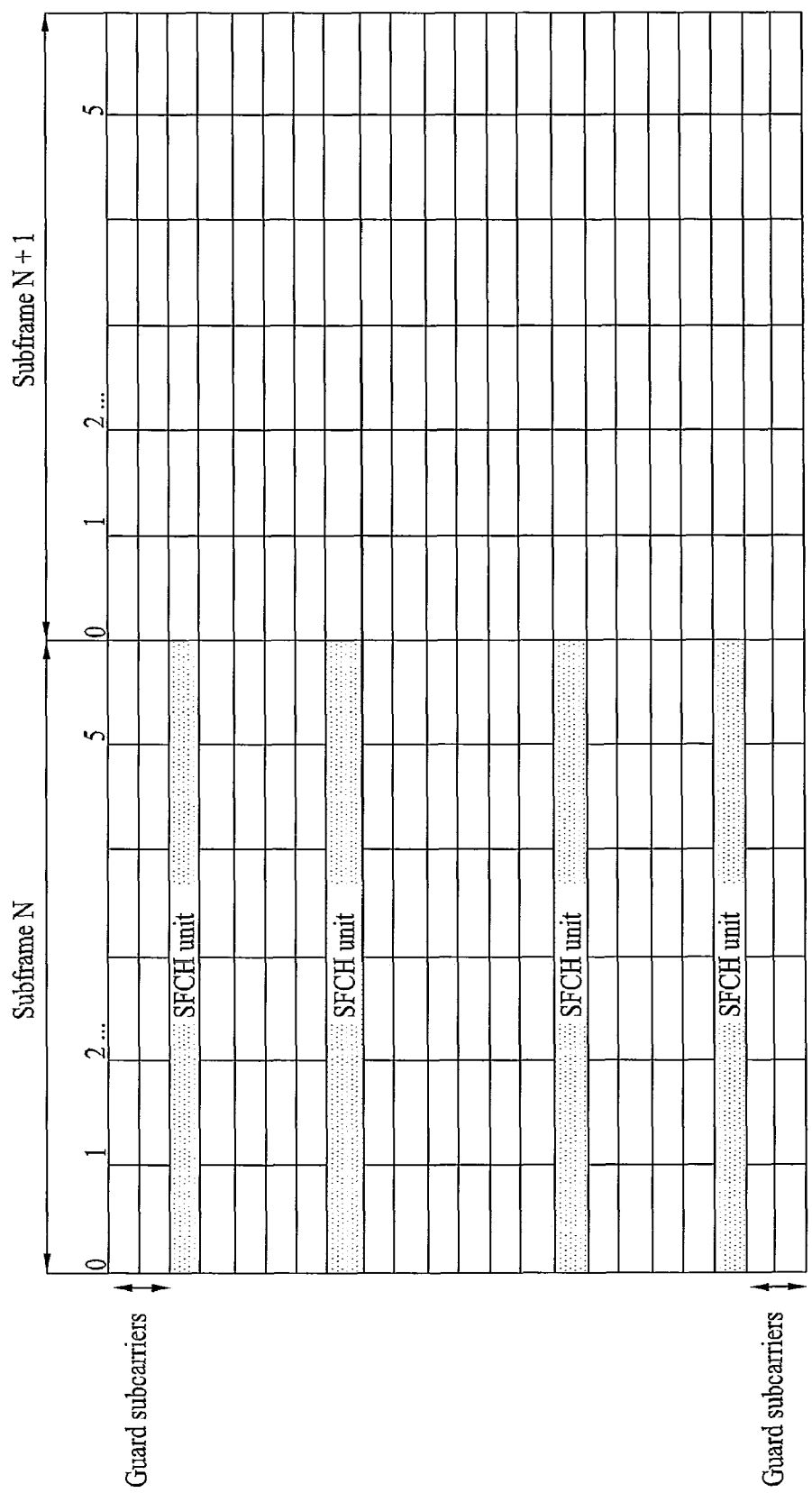

FIGS. 9 and 10 illustrate examples arranging the SFCH of FIG. 5b at intervals of one or more subframes.

An SFCH arranged in an N-th subframe may be constructed to indicate not only a location of resource allocation information of an N-th subframe but also a location of resource allocation information of an adjacent (N+1)-th subframe. In this case, the arranged SFCH may be an SFCH unit.

Figure 11:
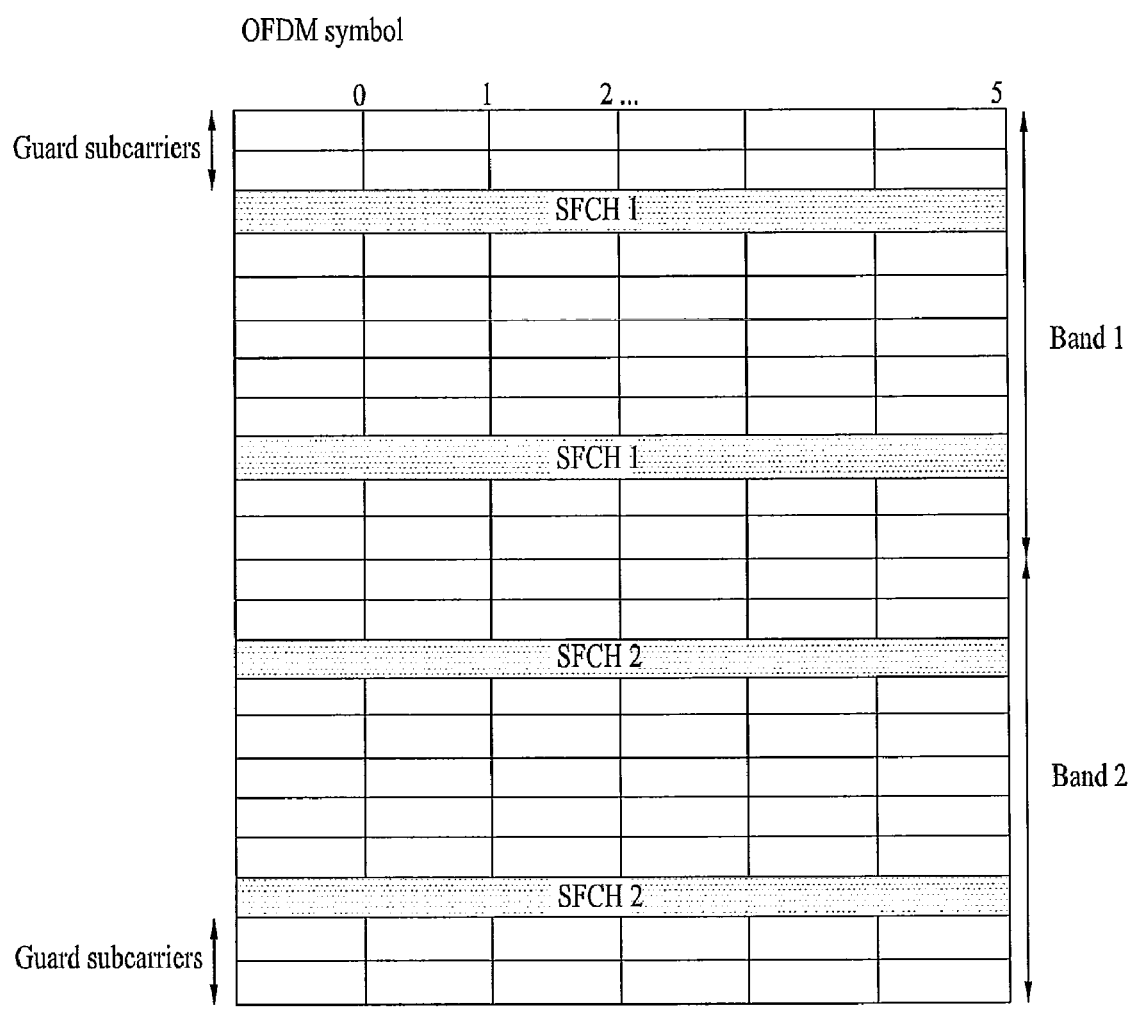
FIG. 11 illustrates an example of a subframe structure according to another exemplary embodiment of the present invention.

FIG. 11 illustrates an example of a subframe structure according to another exemplary embodiment of the present invention.

When a subframe is divided into two bands, that is a first band (Band 1) and a second band (Band 2) and then is transmitted by a multicarrier scheme, SFCHs may be arranged in the respective bands.

For example, a first SFCH (SFCH 1) of the first band (Band 1) may include information as to a location of resource allocation information of the first band. A second SFCH (SFCH 2) of the second band (Band 2) may include information as to a location of resource allocation information of the second band. A user equipment can discern a resource distribution method of a specific band by reading at least one of the first and second SFCHs (SFCH 1 and SFCH 2). Specifically, if the user equipment is able to read both the first band and the second band, the user equipment can read resource allocation information of each band based on each SFCH.

Figure 12:
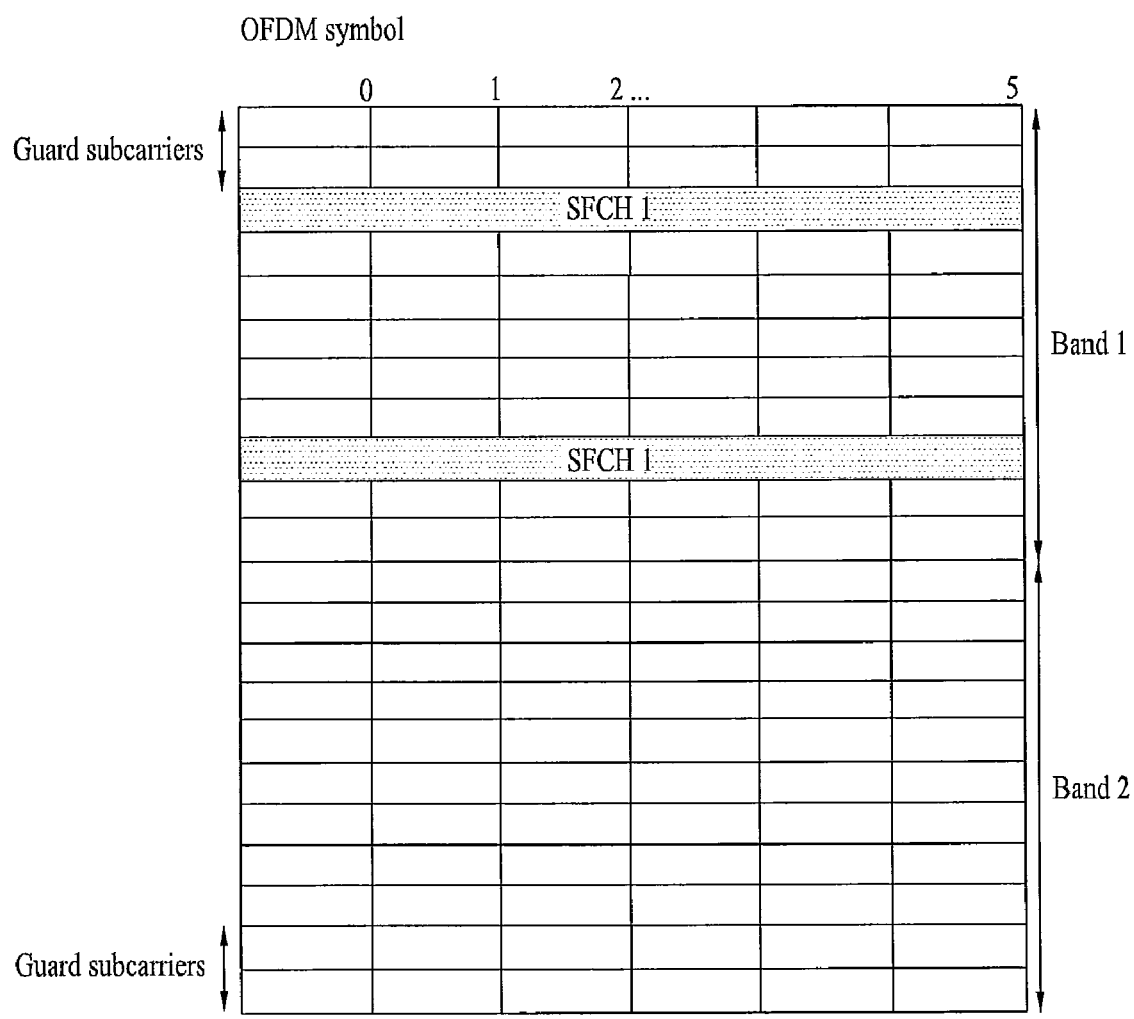
FIG. 12 illustrates an example of a subframe structure according to a further exemplary embodiment of the present invention.

FIG. 12 illustrates an example of a subframe structure according to a further exemplary embodiment of the present invention.

Referring to FIG. 12, an SFCH may be arranged only in one band and a location of resource allocation information of the other band may be informed through the band in which the SFCH is arranged. For example, an SFCH of a first band (Band 1) may inform the user equipment of a location of resource allocation information of a second band (Band 2).

Although, in FIGS. 11 and 12, respective bands are adjacent to each other, the present invention is not limited thereto and bands may be separated from each other.

According to the exemplary embodiments of the present invention, when both the localized permutation and the distributed permutation are used, the resource distribution method is transmitted to the user equipment. Therefore, an effect of the distributed permutation can be maximized without a great influence on the performance of the localized permutation and a problem of decoding failure or latency can be prevented.

The present invention provides a method for generating a subframe to indicate a transmission location of resource allocation information in a structure in which the resource allocation information is transmitted every subframe. The present invention is applicable to a base station, a user equipment, etc. of an IEEE 802.16m system and a system compatible therewith.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for generating a subframe by a base station, comprising:
   arranging, by the base station, resource allocation information in the subframe by sequentially allocating a localized permutation and a distributed permutation; and
   arranging, by the base station, a subframe control header including a resource unit index in a predetermined location by a system parameter, wherein the resource unit index indicates a frequency resource location of the resource allocation information.

2. The method according to claim 1, wherein the resource unit index is information indicating at least one of a location of resource units of the resource allocation information and the number of the resource units.

3. The method according to claim 1, wherein the subframe control header includes locations of groups generated according to the localized permutation out of the resource allocation information.

4. The method according to claim 3, wherein the subframe control header includes the number of resource units belonging to the generated groups.

5. The method according to claim 1, wherein the arranging of the subframe control header is characterized by arranging the subframe control header in subcarriers except for guard subcarriers.

6. The method according to claim 1, wherein the arranging of the subframe control header comprising arranging the subframe control header in two or more consecutive subframes.

7. The method according to claim 1, further comprising:
   transmitting the subframe with the subframe control header.

8. A method for generating a subframe transmitted by a multicarrier scheme by a base station, comprising:
   arranging, by the base station, resource allocation information in a first band and a second band of the subframe by sequentially allocating a localized permutation and a distributed permutation; and
   arranging, by the base station, a first subframe control header and a second subframe control header including a resource unit index in the subframe, wherein the resource unit index indicates a frequency resource location of the resource allocation information of each band.

9. The method according to claim 8, wherein the arranging of the first and second subframe control headers is characterized by arranging the first subframe control header in the first band and arranging the second subframe control header in the second band.

10. The method according to claim 8, further comprising:
    transmitting the subframe with the subframe control header.

11. A method for generating a subframe transmitted by a multicarrier scheme by a base station, comprising:
    arranging, by the base station, resource allocation information in a first band and a second band of the subframe by sequentially allocating a localized permutation and a distributed permutation; and
    arranging, by the base station, a first subframe control header including a resource unit index only in the first band, wherein the resource unit index indicates a frequency resource location of the resource allocation information of the first band.

12. The method according to claim 11, further comprising:
    transmitting the subframe with the subframe control header.

13. A method for generating a subframe constituting a superframe by a base station, comprising:
    adding, by the base station, location information of a subframe control header in a super MAP of the superframe;
    arranging, by the base station, resource allocation information in the subframe by sequentially allocating a localized permutation and a distributed permutation; and
    arranging, by the base station, the subframe control header including a resource unit index according to the location information, wherein the resource unit index indicates a frequency resource location of the resource allocation information.

14. The method according to claim 13, further comprising:
    transmitting the subframe with the subframe control header.

* * * * *